(12) United States Patent
Zhang et al.

(10) Patent No.: US 7,103,698 B2
(45) Date of Patent: Sep. 5, 2006

(54) DOCKING ALIGNMENT SENSOR

(75) Inventors: Tim L. Zhang, Shanghai (CN); Robert C. Hurbanis, Jr., Tomball, TX (US); Dan Forlenza, Cypress, TX (US); Jeffrey Kevin Jeansonne, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 133 days.

(21) Appl. No.: 10/955,600

(22) Filed: Sep. 29, 2004

(65) Prior Publication Data

US 2006/0069837 A1 Mar. 30, 2006

(51) Int. Cl.
*G06F 13/00* (2006.01)
*G06F 1/16* (2006.01)

(52) U.S. Cl. ........................... 710/303; 361/686
(58) Field of Classification Search ............... 710/303
See application file for complete search history.

(56) References Cited

U.S. PATENT DOCUMENTS 5,884,049 A * 3/1999 Atkinson ............... 710/303
6,522,533 B1 * 2/2003 Ikeuchi et al. ............ 361/686
6,952,344 B1 * 10/2005 Weng ..................... 361/686
7,009,362 B1 * 3/2006 Tsukamoto et al. ....... 320/107
2006/0044094 A1 * 3/2006 Davis et al. .............. 335/220

* cited by examiner

*Primary Examiner*—Rehana Perveen
*Assistant Examiner*—Brian Misiura
(74) *Attorney, Agent, or Firm*—David W. Boyd

(57) ABSTRACT

A docking station for an electronic device senses the position of the electronic device and provides an electronically-generated feedback signal to a user indicating whether the device and the docking station are in proper alignment for docking. The sensing may optionally be accomplished by electrical contacts or may optionally be accomplished by sensing a magnetic field using a Hall effect sensor. The feedback signal may be visible or may be audible. The feedback signal may provide instructions to the user indicating which direction one of the components should be moved to achieve proper alignment. A simple backstop arrangement may provide proper alignment in one axis, while the feedback signal provides information about the alignment in a second axis, preferably generally orthogonal to the first. The electronic device may be a laptop portable computer.

39 Claims, 9 Drawing Sheets

DOCKING ALIGNMENT SENSOR

FIELD OF THE INVENTION

The present invention relates generally to portable electronic devices, and more specifically to the connection of a portable electronic device with a docking station.

BACKGROUND OF THE INVENTION

Portable electronic devices, such as personal digital assistants (PDAs) and "laptop" or "notebook" portable computers, are increasingly popular. The capabilities and portability of these devices enable increased productivity and freedom of movement for their users. However, designing these devices for portability typically requires that some other features be compromised. For example, in comparison with desktop computer system, portable computers typically have smaller keyboards and display screens and have fewer interface ports for attaching peripherals. An additional disadvantage of portability is that portable devices can operate for only a limited time on their internal batteries before battery recharging or replacement is required.

Often, a user of a portable device will connect a portable device to a docking station when the device is to be used in a fixed location, such as a central office. A docking station may allow connection of a full-size display and a full-size keyboard, may provide additional interface ports, and may charge the device batteries from the mains while the computer is connected to the docking station. A docking station may sometimes be called a port replicator.

Often, a proprietary electrical connection is provided between the device and the docking station for carrying power and data signals. This proprietary connection is often located on the back or bottom of the device, and thus connecting the device to the docking station is a "blind" operation. That is, the connector is not visible to the user, making it difficult to align the device and docking station so that the connector can engage easily. This difficulty may result in frustration, lost time, and possibly damage to the connector or other components.

One prior solution to this problem has been to provide mechanical features that assist the user in visually aligning the device with the docking station. However, visual guides may not be visible in some applications, as when a portable computer is docked under a monitor screen.

Another prior solution has been to provide mechanical features that guide the device into position on the docking station and provide tactile feedback when the device and docking station are properly aligned. This solution may not easily accommodate multiple device models attaching to the same docking station. For example, it may be difficult for a computer designer to ensure that a new computer model is compatible with an existing docking station model.

Some docking stations use a motorized capture mechanism that transports the electronic device into its docked position. These stations may be complex and expensive.

There is a need for a docking solution that is simple, reliable, and can accommodate multiple electronic device models.

SUMMARY OF THE INVENTION

A docking station for an electronic device senses the position of the electronic device and provides an electronically-generated feedback signal that indicates whether the device and the docking station are in proper alignment for docking.

DETAILED DESCRIPTION

Figure 1:
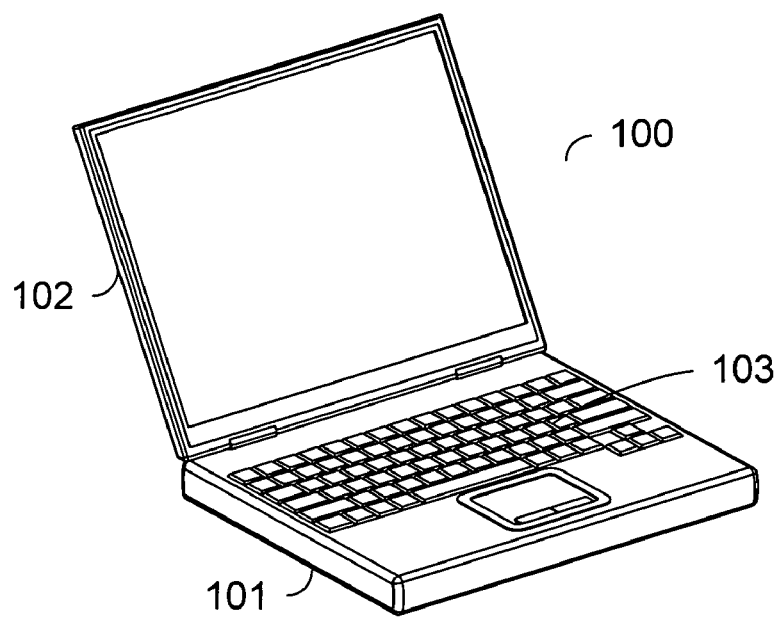
FIG. 1 shows a perspective view of a laptop portable computer in accordance with an example embodiment of the invention.

A laptop portable computer serves as an example of an electronic device with which the invention is particularly useful. FIG. 1 shows a perspective view of a laptop portable computer 100 in accordance with an example embodiment of the invention, comprising a base portion 101 and a display portion 102. Base portion 101 further comprises a keyboard 103, and may also further comprise a central processing unit, random access memory, nonvolatile storage, and other components. Display portion 102 may be used to communicate information to a user of computer 100, for example by an operating system or application program running on computer 100. In FIG. 1, computer 100 is depicted in an open configuration, so that keyboard 103 and a display on display portion 102 are accessible to the computer user.

Figure 2:
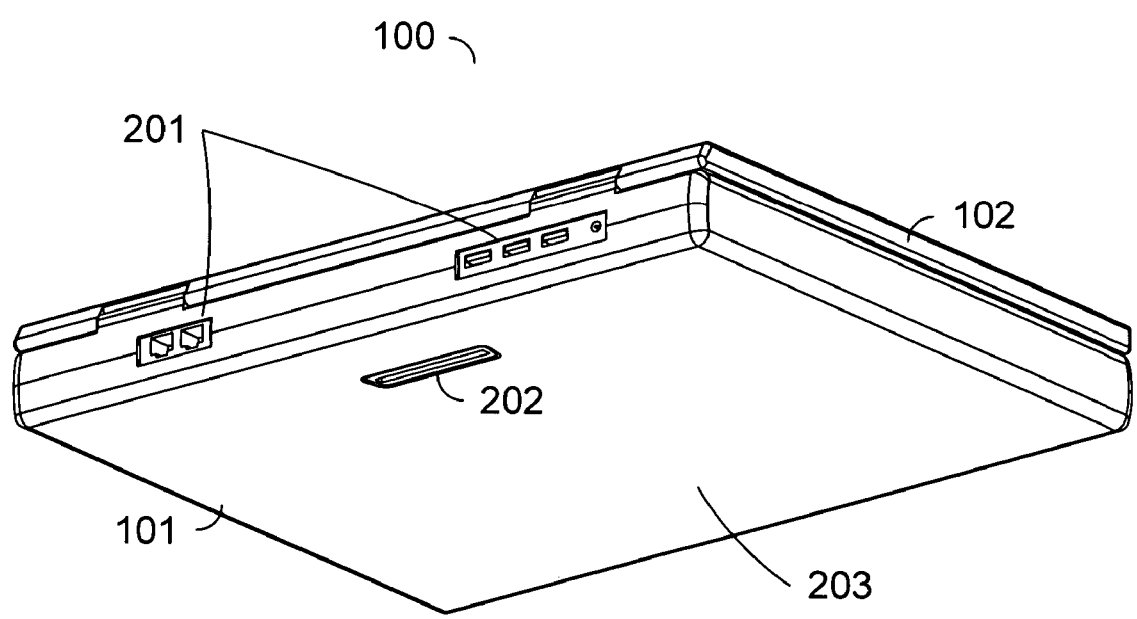
FIG. 2 shows a perspective view of the computer of FIG. 1 from a reverse angle.

FIG. 2 shows a perspective view of the computer of FIG. 1 from a reverse angle. In FIG. 2, display portion 102 has been closed. That is, the display in display portion 102 has been rotated into a position near keyboard 103, so that the computer is easily portable or storable. Computer 100 further comprises a computer connector set 201, which may comprise peripheral interface ports, a receptacle for supplying power, connectors for an external mouse and keyboard, network connections, or other kinds of connections. Computer 100 also further comprises a docking connector 202. Connector 202 is shown as placed on a bottom surface 203 of computer 100, although other placements are possible. Docking connector 202 carries signals that may duplicate many of the signals carried by various connectors of computer connector set 201, the duplicate signals from several connectors being routed through conductors in docking connector 202.

Figure 3:
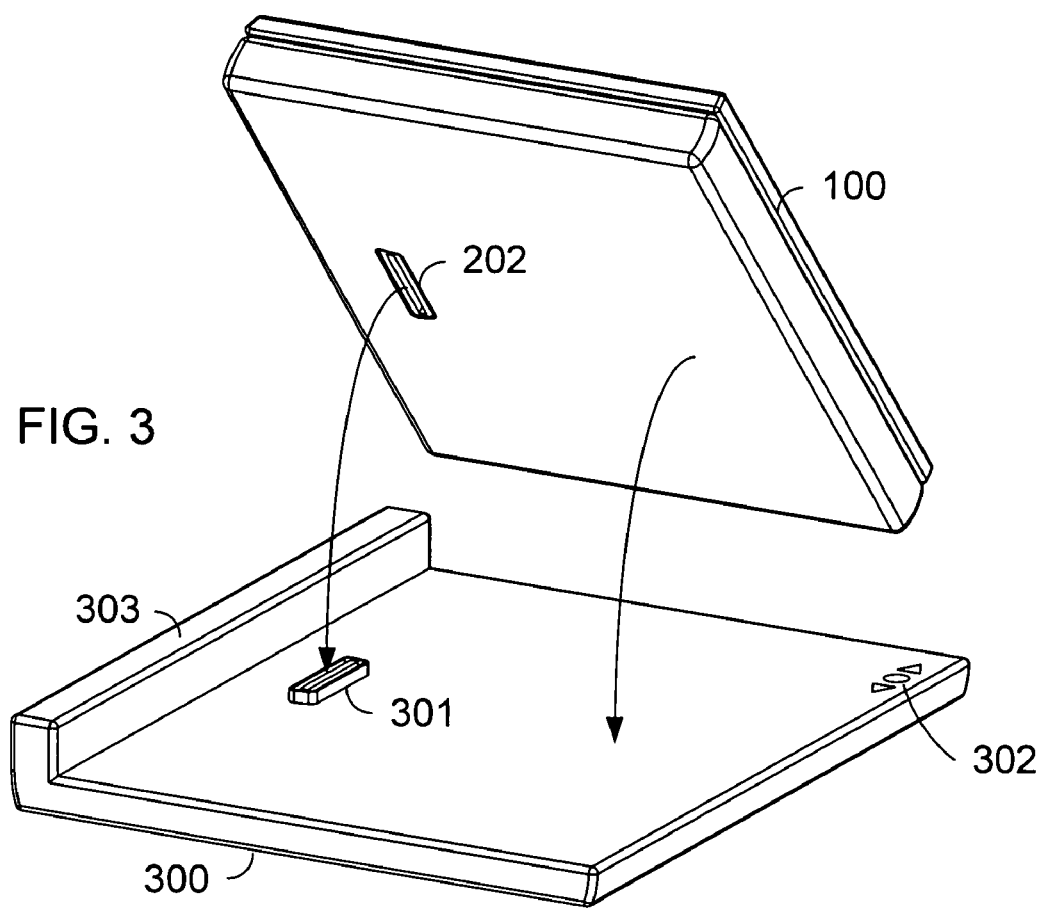
FIG. 3 shows a docking station in accordance with an example embodiment of the invention, with computer of FIG. 1 poised to connect to it.

FIG. 3 shows a docking station 300 in accordance with an example embodiment of the invention, with computer 100 poised to connect to it. Docking station 300 comprises a mating connector 301 that is configured to mate with docking connector 202 on computer 100.

Figure 4:
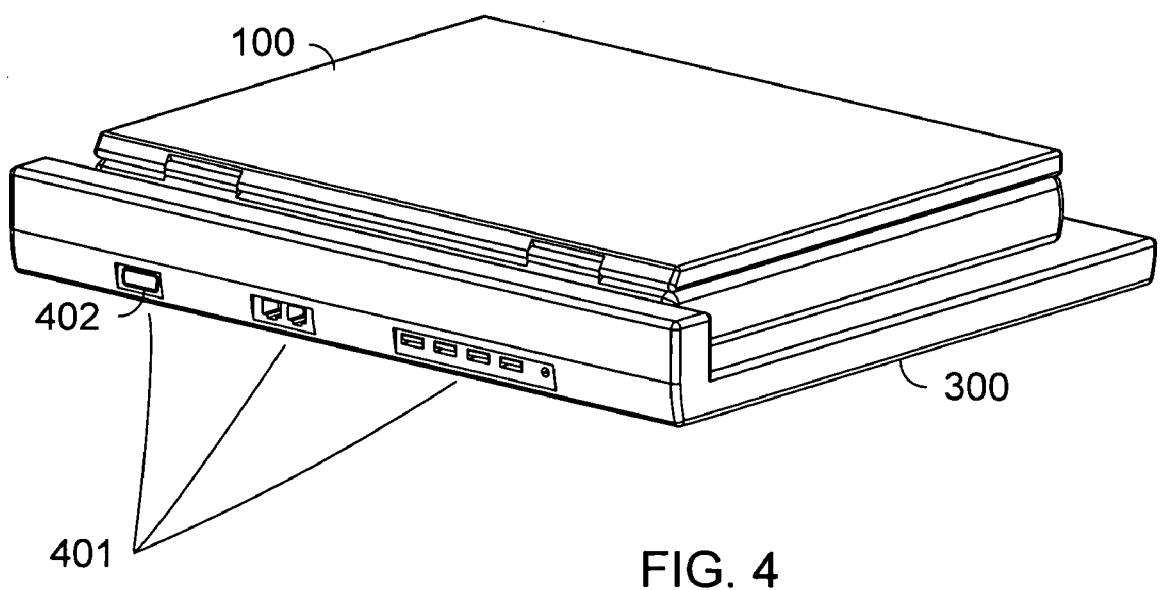
FIG. 4 shows, from a reverse angle, the computer and docking station of FIG. 3 in their docked configuration.

FIG. 4 shows, from a reverse angle, docking station 300 and computer 100 in their docked configuration. In the configuration of FIG. 4, docking connector 202 and mating connector 301 have engaged, so that signals may pass between computer 100 and docking station 300. Docking station 300 further comprises a docking station connector set 401, for connecting to external peripherals, networks, and the like. Docking station connector set 401 need not exactly replicate computer connector set 201. That is, docking station connector set 401 may comprise more or fewer peripheral interface connectors than computer connector set 201, and may comprise types of connectors not available in computer connector set 201. For example, docking station connector set 401 may comprise a connection, such as connector 402, for attaching a full-size video display to be used in lieu of or in addition to the display in display portion 201, while computer connector set 201 may lack such a connector. Many other configurations are possible.

Figure 5:
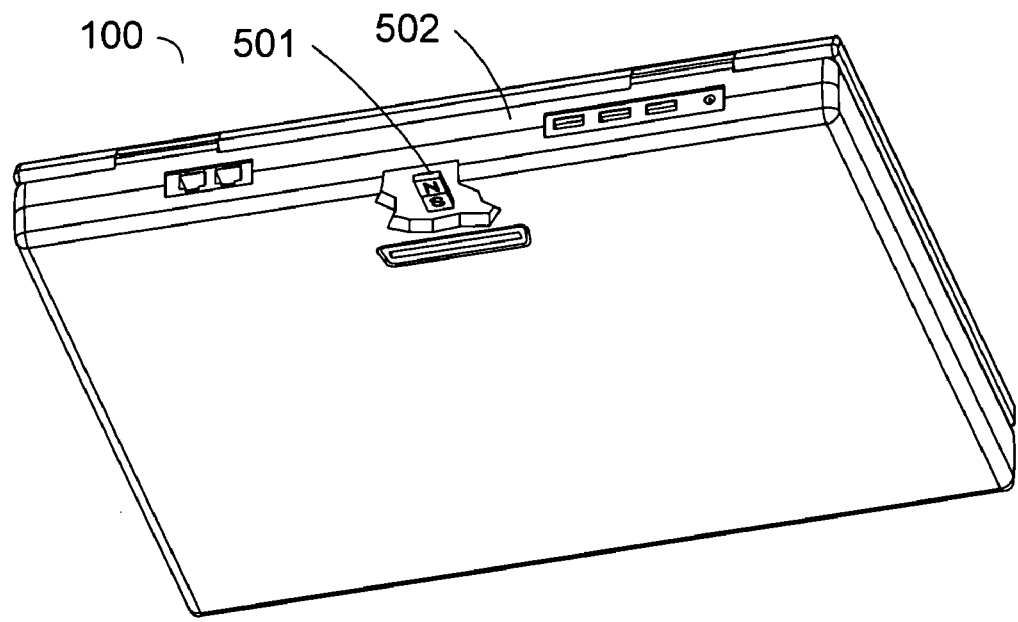
FIG. 5 shows a partially-cutaway view of the computer of FIG. 1.

FIG. 5 shows a partially-cutaway view of computer 100, exposing a bar magnet 501 that is comprised in computer 100. Bar magnet is positioned generally perpendicular to back edge 502 of computer 100, and so that its north magnetic pole is near back edge 502 and its south magnetic pole is directed away from back edge 502. Bar magnet 501 is affixed in computer 100 by one of a large variety of methods known in the art. The polarity of bar magnet 501 is chosen arbitrarily, and may be the reverse of the orientation shown with appropriate adjustments to other components.

Figure 6:
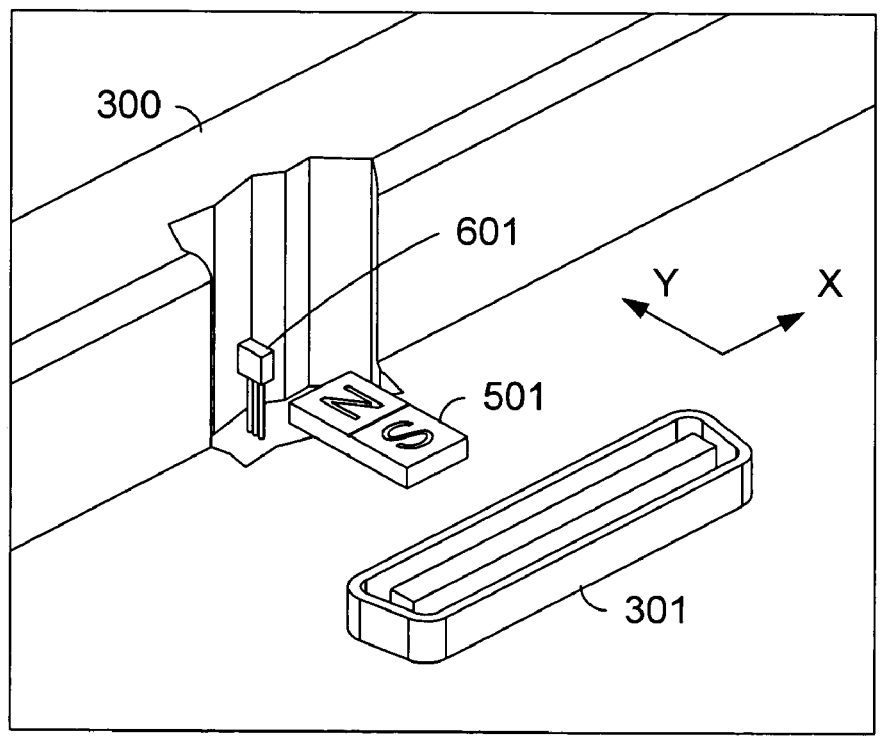
FIG. 6 shows a partially-cutaway view of the docking station of FIG. 3 and a magnet in relation to a Hall effect sensor in the docking station.

FIG. 6 shows a partially-cutaway view of docking station 300, exposing a Hall effect sensor 601 that is comprised in docking station 300. FIG. 6 also shows the position of magnet 501 when computer 100 is docked. Hall effect sensor 601 is preferably a linear Hall effect sensor, which produces a voltage proportional to the magnetic flux passing through the sensor generally orthogonal to its sensing element. Sensor 601 may be, for example, a model A 1321 Hall effect sensor available from Allegro MicroSystems, Inc. of Worcester, Mass., USA. In the example arrangement of FIG. 6, Hall effect sensor 601 is sensitive to magnetic flux parallel to the X axis. Sensor 601 may be affixed in docking station 601 by any of a large variety of methods known in the art. For example, sensor 601 may be mounted on a circuit board, or may be clamped in place, or may be affixed using an adhesive.

Figure 7:
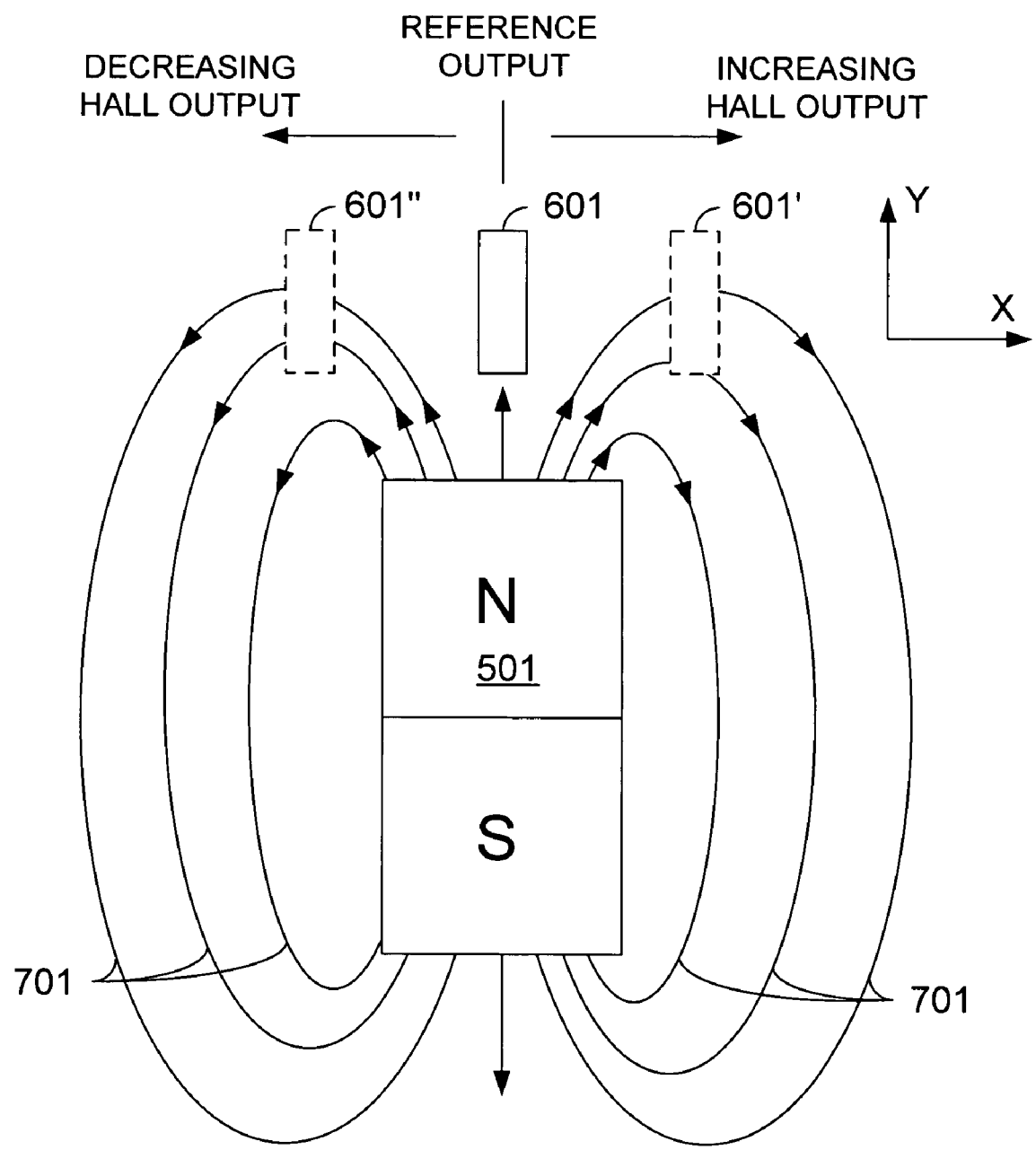
FIG. 7 illustrates the interaction of a magnet and a Hall effect sensor.

FIG. 7 illustrates the interaction of magnet 501 and Hall effect sensor 601. Flux lines 701 emanate from the north magnetic pole of magnet 501 and loop to the south magnetic pole. Flux lines are imaginary lines that aid in visualizing the magnetic flux surrounding a magnet. When magnet 501 and the Hall effect sensor are aligned such that Hall effect sensor is in the position designated by reference numeral 601, no net magnetic flux passes through Hall effect sensor 601 in a direction parallel to the X axis, and Hall effect sensor 601 produces a reference voltage. When relative displacement in the X axis is introduced so that the Hall effect sensor moves toward relative location 601' (as when magnet 501 is moved in the negative X direction), a net magnetic flux passes through the Hall effect sensor in the positive X direction. The net flux strength is approximately proportional to the relative X-axis displacement of magnet 501 and Hall effect sensor 601, at least for displacements of practical interest. Consequently, Hall effect sensor 601 produces a voltage that departs from the reference voltage by an amount approximately proportional to the relative displacement. (As the displacement grows very large, the effect of the magnet diminishes and the output of the Hall effect sensor returns to its reference value, but the approximately linear range is sufficiently large for practical use.) Conversely, as magnet 501 and sensor 601 displace relatively such that Hall effect sensor 601 moves toward relative location 601", the voltage output from the Hall effect sensor departs approximately in proportion to the displacement distance, but in the opposite sense. For example, when magnet 501 is moved in the negative X direction, the output voltage may increase, and when magnet 501 is moved in the positive X direction, the voltage may decrease. A system may easily be designed having the opposite relationship. That is, the voltage output by Hall effect sensor 601 may decrease as magnet 501 is moved in the negative X direction.

The voltage produced by Hall effect sensor 601 is thus an indication of the relative position, in the X axis, of magnet 501 and Hall effect sensor 601. Because magnet 501 is comprised in computer 100 and Hall effect sensor 601 is comprised in docking station 300, the voltage produced by Hall effect sensor 601 is also an indication of the relative position, in the X axis, of computer 100 and docking station 300. A system in accordance with an example embodiment of the invention uses this indication to provide an electronically-generated feedback signal to assist the user in aligning computer 100 with docking station 300 for proper engagement of docking connector 202 with mating connector 301.

Figure 8:
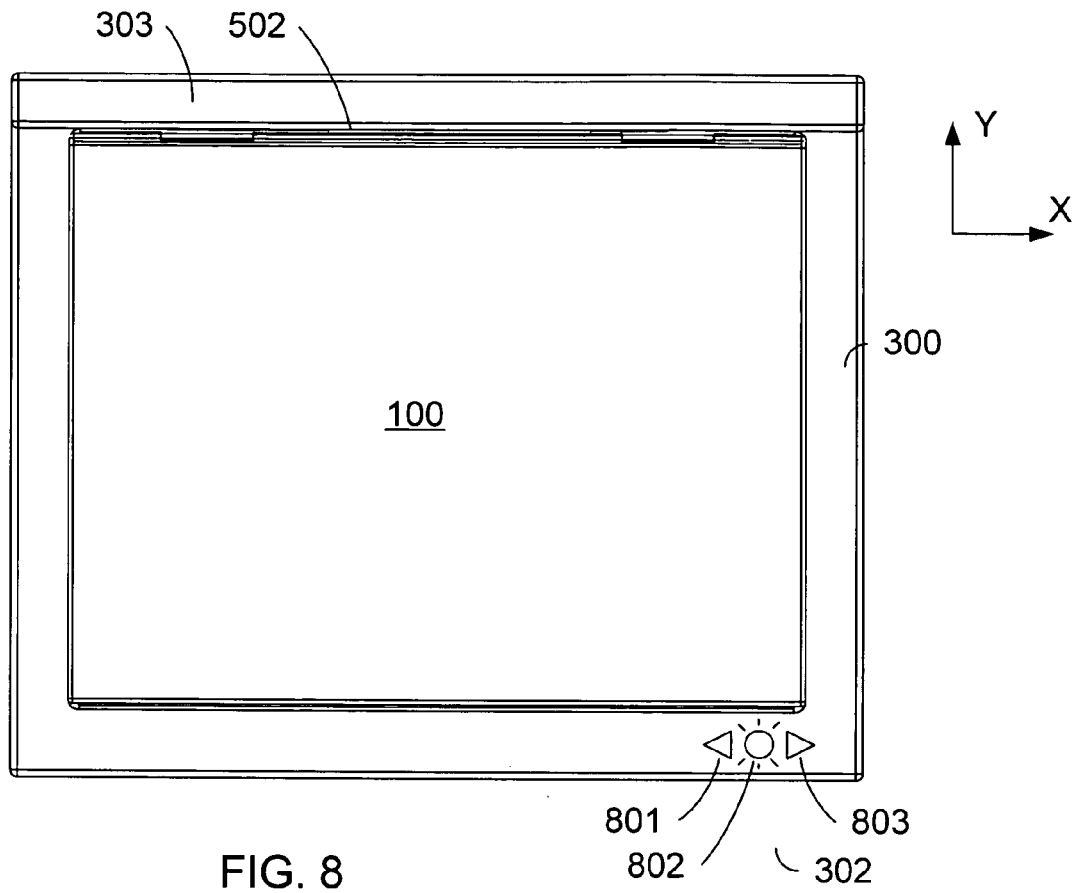
FIG. 8 depicts the system of FIG. 4 from a top view, showing an indicator set on the docking station.

Referring again to FIG. 3, docking station 300 further comprises a backstop 303 and a set of indicators 302. Indicator set 302 is positioned such that it is visible when computer 100 is docked in docking station 300, and during the process of docking. FIG. 8 shows indicator set 302 in greater detail. Example indicator set 302 further comprises left indicator 801, center indicator 802, and right indicator 803. In the example embodiment of FIG. 8, each indicator may be illuminated by a light source inside docking station 300, for example a light emitting diode (LED).

During docking, the system evaluates the voltage produced by Hall effect sensor 601, and illuminates one of indicators 801–803 to indicate to the user whether computer 100 is properly aligned in the X axis for proper engagement of docking connector 202 and mating connector 301, or which direction computer 100 should be moved in order to achieve proper alignment. For example, if computer 100 is to the right (too far in the positive X direction) of the aligned position, the system illuminates left indicator 801, indicating to the user that computer 100 should be moved to the left (in the negative X direction). If computer 100 is to the left of the aligned position, the system illuminates right indicator 802, indicating that computer 100 should be moved to the right. When computer 100 is properly aligned, the system illuminates center indicator 802. Thus, indicator set 302 provides a visual feedback signal to the user indicating whether computer 100 is properly aligned for docking, and a second, directional feedback signal indicating what relative motion of computer 100 and docking station 300 is necessary to achieve proper alignment.

Alignment in the Y axis is provided by backstop 303. The Y axis is generally perpendicular to the X axis. During docking, the user holds back edge 502 of computer 100 against backstop 303. Backstop 303 is substantially smooth, enabling computer 100 to move back and forth in the X axis. Once computer 100 is properly positioned in both the X and Y axes, the user can complete the docking by engaging docking connector 202 with mating connector 301. In the example system shown, this engagement is accomplished by moving computer 100 downward, perpendicular to the X-Y plane. Because backstop 303 does not constrain computer 100 in the X axis, docking station 300 imposes few design constraints on other models of computers that are to be used with the same docking station. A computer designer has substantial freedom in placement of a docking connector on a new computer model compatible with docking station 300, limited only by the constraints that the Y-direction distance from the back edge to the docking connector of the new computer model be substantially the same as in example computer 100, and that a magnet be provided in the same relationship to the docking connector.

Figure 9:
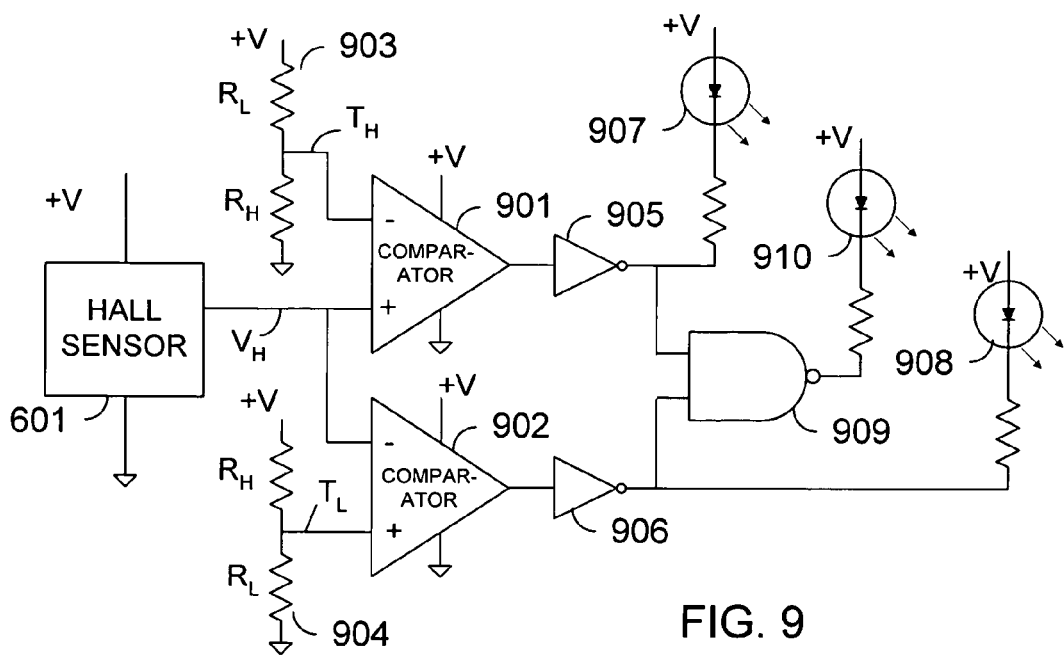
FIG. 9 shows an example circuit for providing a visible feedback signal to a user indicating the state of alignment of the system of FIG. 4.

FIG. 9 shows an example circuit for illuminating the appropriate LED in indicator set 302 in response to the voltage output of Hall effect sensor 601. Hall sensor output $V_H$ is fed to the positive terminal of comparator 901 and the negative terminal of comparator 902. Comparators 901 and 902 may be, for example, comprised in an LM339 quad comparator package available from a variety of suppliers. When no net magnetic flux is passing through Hall effect sensor 601, $V_H$ is a reference voltage approximately equal to one half of the supply voltage +V. Comparator 901 compares $V_H$ to a threshold voltage $T_H$, which is generated by resistor divider 903. Resistor divider 903 is constructed with resistor $R_H$ having a higher resistance than resistor $R_L$. For example, the resistance of resistor $R_H$ may be a 1.3 kΩ, while the resistance of resistor $R_L$ is 1.2 kΩ, so that threshold voltage $T_H$ is about 52% of the voltage +V. When $V_H$ is greater than $T_H$ (indicating that magnet 501 is displaced from Hall effect sensor 601 in the direction that causes $V_H$ to increase), then the output of comparator 901 will approach +V. Inverter 905 then sinks current through LED 907, illuminating it. LED 907 may, for example, illuminate left indicator 801.

Similarly, $T_L$ is generated using resistor divider 904, which is constructed from resistors of the same resistances as resistor divider 903, but with their positions reversed. For example, if the resistance of $R_H$ is 1.3 kΩ and the resistance of $R_L$ is 1.2 kΩ, then $T_L$ is approximately 48% of +V. When $V_H$ is less than $T_L$ (indicating that magnet 501 is displaced from Hall effect sensor 601 in the direction that causes $V_H$ to decrease), then the output of comparator 902 approaches +V, and inverter 906 causes LED 908 to illuminate. LED 908 may illuminate right indicator 803.

If $V_H$ is between $T_H$ and $T_L$, then little net magnetic flux is passing through Hall effect sensor 601, meaning that magnet 501 is aligned with Hall effect sensor 601 and that docking connector 202 is properly aligned in the X axis with mating connector 301. In this case, the outputs of both inverters 905 and 906 approach +V and NAND gate 909 causes LED 910 to illuminate center indicator 802, informing the user of the proper alignment for docking.

Figure 10:
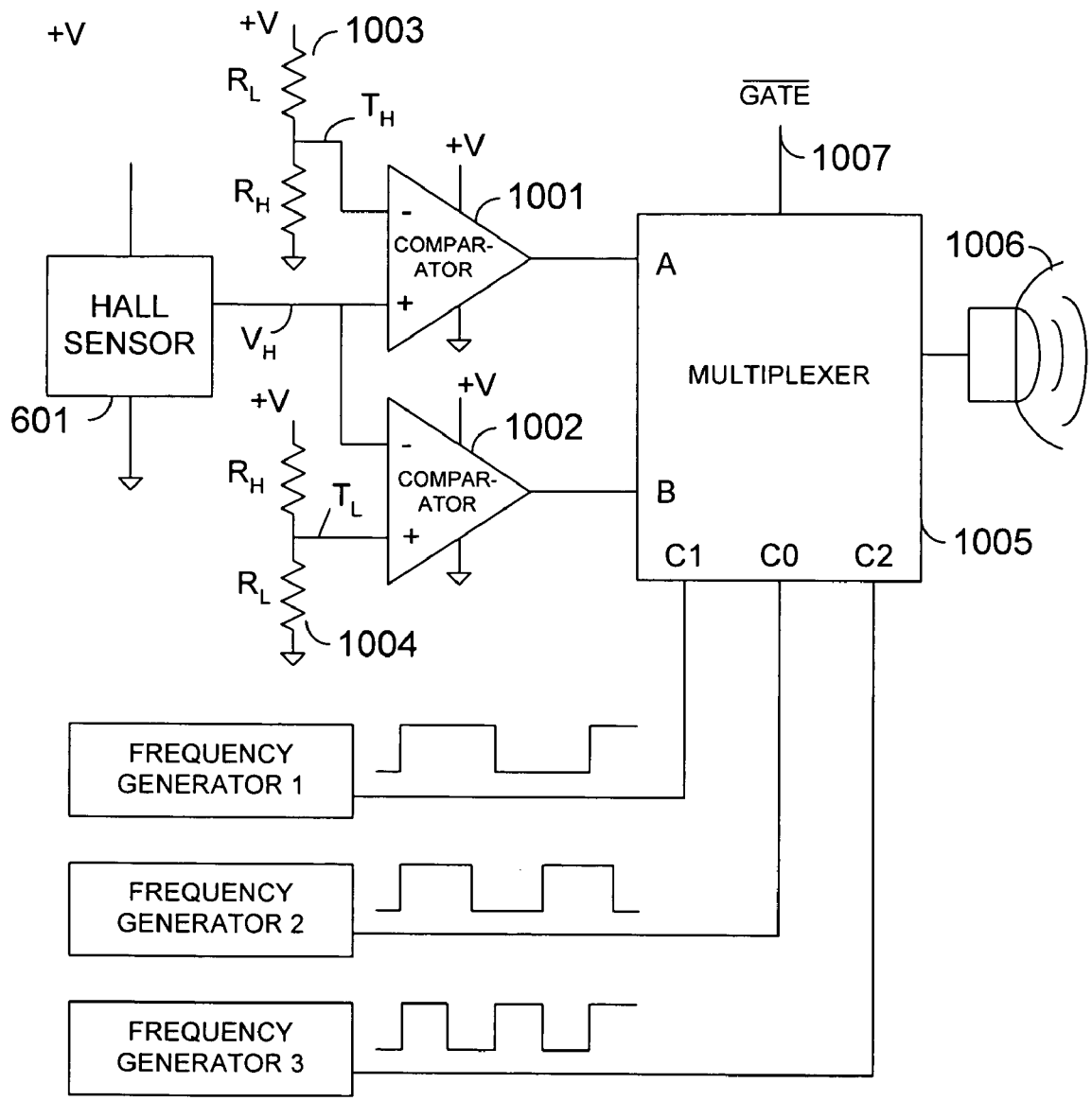
FIG. 10 depicts shows an example circuit for providing an audible feedback signal to a user indicating the state of alignment of the system of FIG. 4.

In a system in accordance with a second example embodiment of the invention, the system uses an audible feedback signal to indicate to the user whether computer 100 is in proper alignment for docking. FIG. 10 depicts a circuit for providing an audio indication to the user. Comparators 1001 and 1002 and resistor dividers 1003 and 1004 perform the same functions as their similar counterparts in FIG. 9. Thus, when $V_H$ is above $T_H$, the output of comparator 1001 approaches +V, and may be considered a logic "high". When $V_H$ is below $T_H$, the output of comparator 1001 approaches ground, and is a logic "low". Similarly, the output of comparator 1002 is a logic "high" if $V_H$ is below $T_L$, and a logic "low" otherwise. Three frequency generators produce signals that alternate between "low" and "high", each at a different frequency. All three frequencies are in the human audible range. In the example shown, frequency generator 1 produces a relatively low-frequency signal, frequency generator 2 produces a relatively higher-frequency signal than does frequency generator 1, and frequency generator 3 produces a relatively higher-frequency signal than does frequency generator 2. A system may be easily designed with different frequency relationships.

Multiplexer 1005 selects one of the three frequency signals to pass to audio speaker 1006, depending on the states of the comparator outputs. For example, multiplexer 1005 may comprise an SN74LS253 data selector/multiplexer integrated circuit commonly available from a number of suppliers. Multiplexer 1005 may further comprise an amplifier. As shown, the circuit of FIG. 10 produces a relatively low-frequency audible tone when it is necessary to move computer 100 in one direction to achieve alignment of docking connector 202 and mating connector 301, a relatively higher-frequency audible tone when the alignment is proper for docking, and a relatively still higher-frequency tone when it is necessary to move computer 100 in the opposite direction. A user may quickly learn to interpret the audible signals in order to achieve proper docking alignment. It may also be desirable for the system to generate a gating signal 1007 indicating that docking connector 202 and mating connector 301 have fully engaged, and to use this gating signal to suppress the output of multiplexer 1005, and thus also the audible feedback signal, when docking has been achieved.

Figure 11:
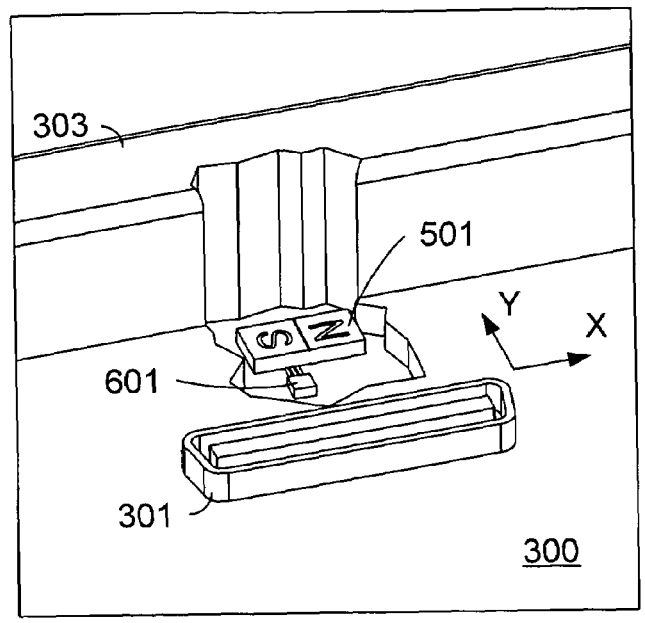
FIG. 11 shows a partially-cutaway view of a docking alignment system having a magnet and a Hall effect sensor in an alternate configuration.

Whether the alignment indication to the user is visual or audible or in another form, other arrangements of the components are possible. For example, magnet 501 and Hall effect sensor 601 may be oriented so that Hall effect sensor 601 is sensitive to magnetic flux that is generally perpendicular to the face of magnet 501. FIG. 11 shows the components in such a configuration. The remainder of computer 100 is not shown in FIG. 11 so that the orientation of magnet 501 is clear.

In the configuration shown in FIG. 11, magnet 100 is centered over Hall effect sensor 601, so that the net magnetic flux passing through sensor 601 is essentially zero and the output of sensor 601 is a reference value. As magnet 501 (and the rest of computer 100) move in the positive X direction, the flux passing through sensor 601 is increasingly dominated by flux emanating from the south magnetic pole of magnet 501, and the voltage output by sensor 601 departs from the reference value. If magnet 501 is displaced in the negative X direction, the flux is increasingly dominated by flux emanating from the north magnetic pole of magnet 501, and the voltage output by sensor 601 departs from the reference value in the opposite direction. The output of sensor 601 may be routed to a circuit such as those shown in FIGS. 9 and 10 for communicating to the user of the system information about the alignment of computer 100 and docking station 300. The polarity of magnet 501 in FIG. 11 is chosen arbitrarily. A system may easily be constructed with magnet 501 in the opposite polarity, with appropriate adjustments to other components.

Figure 12:
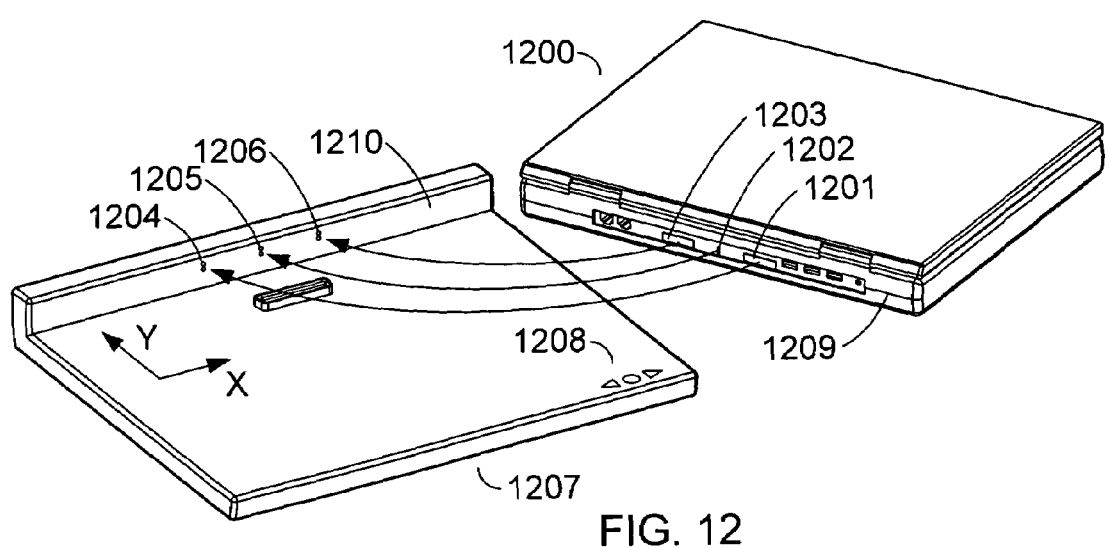
FIG. 12 depicts a system in accordance with another example embodiment of the invention, wherein sensing of the relative alignment of a computer and a docking station is accomplished using electrical contacts.

FIG. 12 depicts a system in accordance with a third example embodiment of the invention. In the system of FIG. 12, the sensing of the relative alignment of computer 1200 and docking station 1207 is accomplished using electrical contacts. In the example system of FIG. 12, during alignment for docking, the user holds back edge 1209 of computer 1200 against backstop 1210 of docking station 1207, and conductive plates 1201, 1202, and 1203 are in proximity to contact sets 1204, 1205, and 1206 respectively.

Conductive plates 1201, 1202, and 1203 may be made, for example of copper, a copper alloy, or another suitable electrically conductive material, and are affixed to the back edge of computer 1200 by any suitable mechanical means. The individual contacts in contact pairs 1204, 1205, and 1206 may be made of a similar conductive material. When one of the conductive plates, for example plate 1203, touches both contacts of a contact pair, for example contact pair 1206, an electrical circuit is completed, and one of indicators 1208 is illuminated, indicating whether computer 1200 must be moved to achieve proper alignment for docking. For the purposes of this disclosure, a circuit is completed across a set of contacts when a conductive member touches both contacts, creating a conduction path between the members of the set of contacts.

Figure 13:
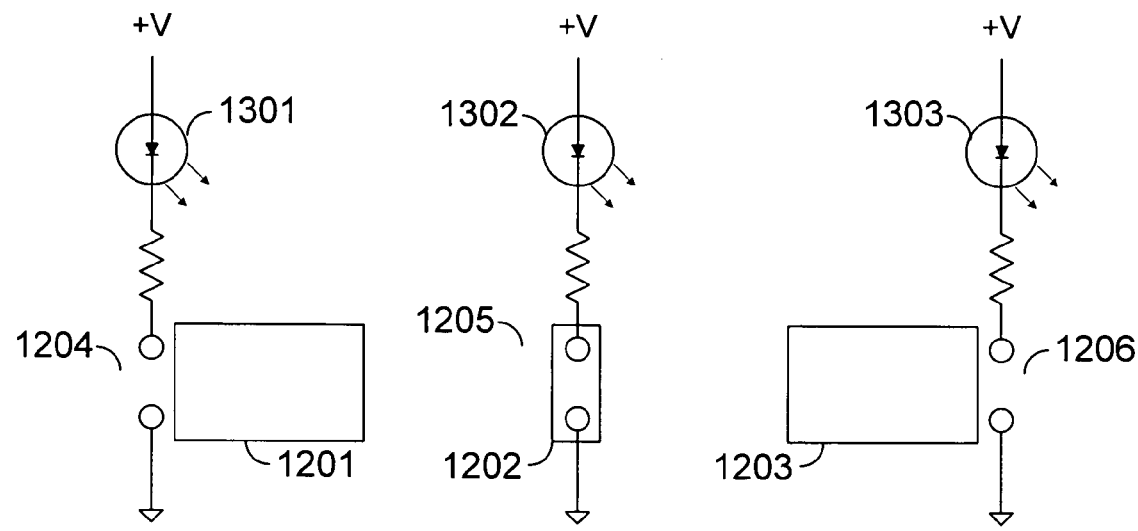
FIG. 13 shows the interaction of the electrical contacts of FIG. 12 and conductive plates.

FIG. 13 shows the interaction of the conductive plates 1201–1203 and contact sets 1204–1206 of FIG. 12 in more detail. As configured in FIG. 13, computer 1200 and docking station 1207 are properly aligned for docking, and plate 1202 touches contact set 1205, completing a circuit that illuminates LED 1302. Because of the spacing of contact sets 1204 and 1206, plates 1201 and 1203 do not complete circuits across contact sets 1204 and 1206. For example, contact sets 1204–1206 may be uniformly spaced apart by 45.5 millimeters (so that contact sets 1204 and 1206 are 91 millimeters apart), while the distance from the left edge of plate 1201 to the right edge of plate 1203 is 90 millimeters, making it impossible for both LED 1301 and LED 1303 to be illuminated at the same time. Similarly, the distance from the left edge of plate 1201 to the right edge of plate 1202 (and the distance from the left edge of plate 1202 to the right edge of plate 1203) may be slightly less than 45.5 millimeters, making it impossible for LED 1302 to be illuminated simultaneously with either LED 1301 or LED 1303.

A system may be designed wherein the sensing of the relative position of the electronic device and the docking station is accomplished by sensing the breaking of an electrical circuit rather than the completion of an electrical circuit. For example, the areas on back edge 1209 of computer 1200 that are covered with plates 1201–1203 may be interchanged with the interstitial areas that are not covered with plates. In this arrangement, a circuit is completed across contact set 1205 when computer 1200 is held against backstop 1210 but not in proper alignment for docking. Upon proper alignment, the circuit across contact set 1205 is broken in this arrangement. Appropriate changes to the relevant circuitry can be made so that the correct feedback signals are provided.

Figure 14:
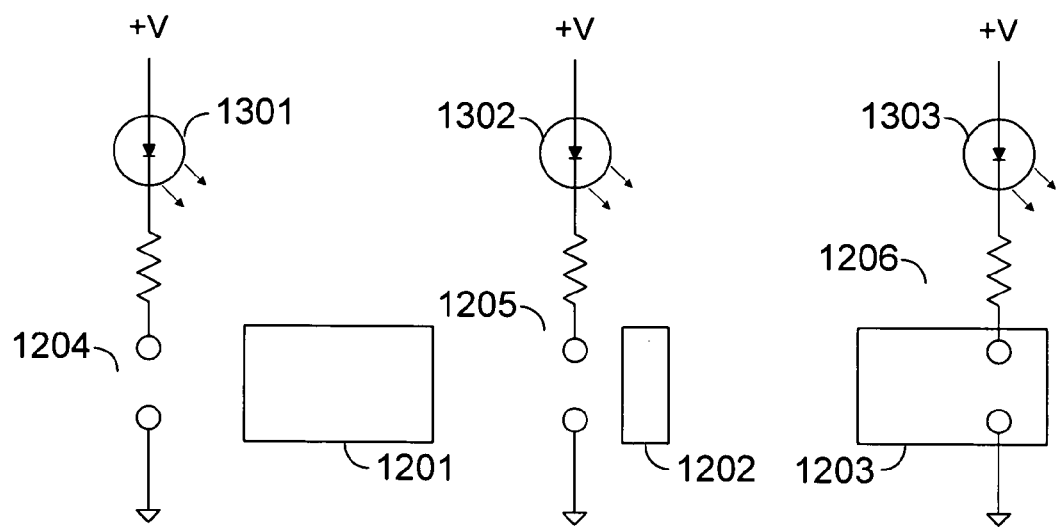
FIG. 14 shows the system of FIG. 13 in an alternate state of alignment.

FIG. 14 shows the interaction of conductive plates 1201–1203 and contact sets 1204–1206 when computer 1200 has been shifted in the positive X direction from the position depicted in FIG. 13. In this configuration, plate 1203 completes a circuit by touching contact set 1206, illuminating LED 1303. LED 1303 may, for example, illuminate in indicator in indicator set 1208 instructing the computer user to move computer 1200 in the negative X direction in order to achieve proper alignment for docking.

In accordance with a fourth example embodiment of the invention, electrical contacts are used to sense the spatial relationship of computer 1200 and a docking station, and an audible feedback signal is used to inform the user when the computer and docking station are properly aligned for docking, or of the relative movement necessary to achieve proper alignment.

While the invention has been described using a laptop portable computer as an example electronic device, other kinds of electronic devices may be used in example embodiments as well. For example, a personal digital assistant (PDA) is a portable electronic device that typically comprises memory, a processor system, a display screen and a user interface that enables a user to quickly store and data. Typical applications for PDAs include electronic mailing, managing telephone and electronic mail contacts, web browsing, playing music, and displaying digital photographs. A user may place a PDA in a docking station that connects the PDA to a computer for uploading or downloading data, electronic mail synchronization, or other interactions. The docking station may also recharge batteries in the PDA. Docking of a PDA may involve similar difficulties as does docking a laptop portable computer, and the invention may be embodied in a system comprising a PDA.

Figure 15:
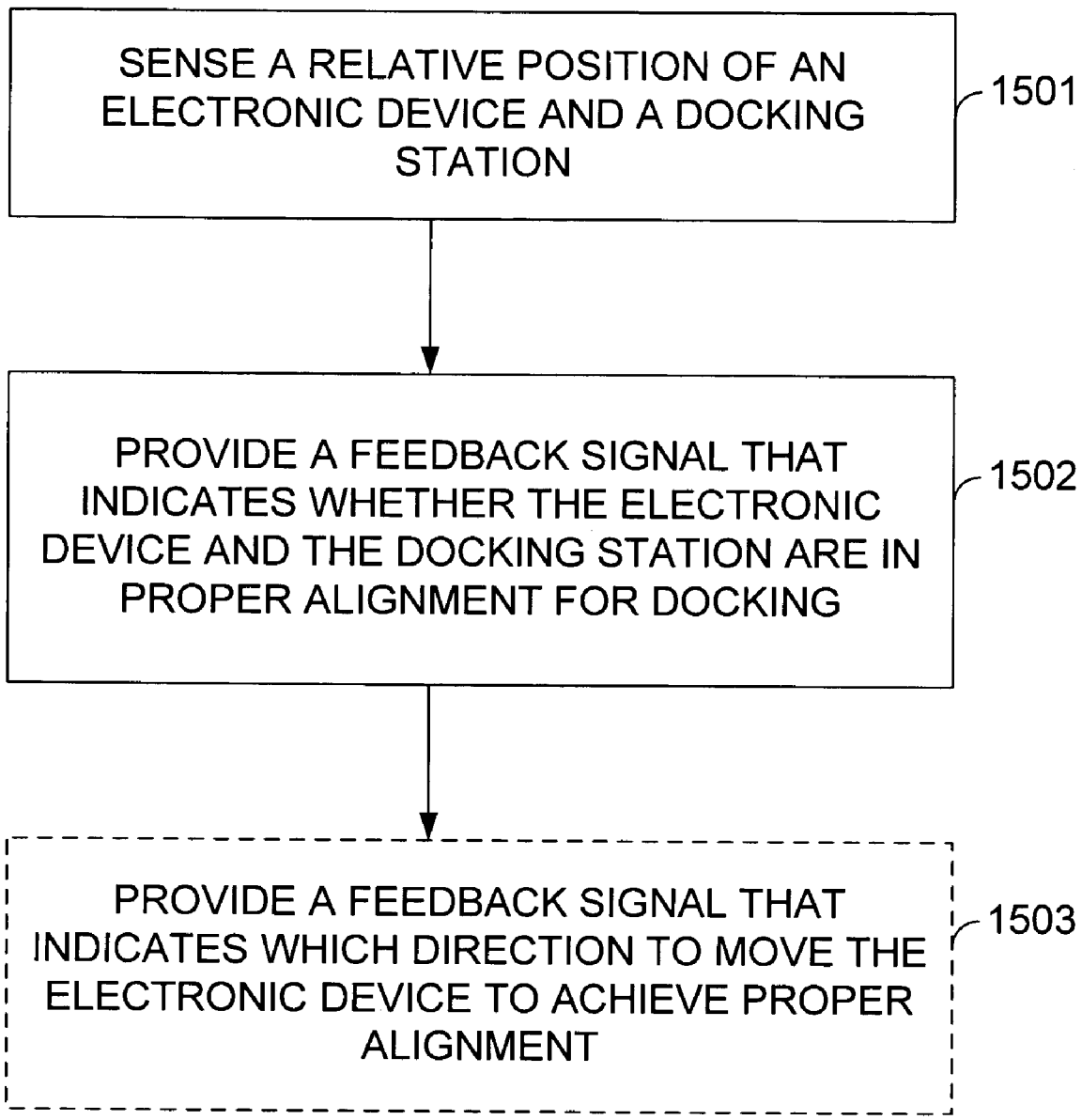
FIG. 15 depicts a flowchart of a method in accordance with another example embodiment of the invention.

FIG. 15 depicts a flowchart of a method in accordance with another example embodiment of the invention. In step 1501, a relative position of an electronic device and a docking station is sensed. In step 1502, a feedback signal is provided that indicates whether the electronic device and the docking station are in proper alignment for docking. In optional step 1503, a feedback signal is provided that indicates which direction to move the electronic device to achieve proper alignment. The fact that step 1503 is optional is indicated in FIG. 15 by showing the process block 1503 in broken lines.

The invention claimed is:

1. A system comprising:
   an electronic device; and
   a docking station;
   the system sensing a relative position of the electronic device and the docking station, and providing an electronically-generated feedback signal that indicates whether the electronic device and the docking station are in proper alignment for docking, and
   the system further providing a directional feedback signal that indicates which direction to move one of the system components in order to achieve proper alignment for docking.

2. The system of claim 1, wherein the directional feedback signal is visible.

3. The system of claim 2, wherein providing the directional signal further comprises illuminating an indicator to indicate a direction.

4. The system of claim 3, wherein the indicator is illuminated using a light emitting diode.

5. The system of claim 1, wherein the directional feedback signal is audible.

6. The system of claim 5, wherein a frequency of the directional feedback signal indicates which direction to move one of the system components in order to achieve proper alignment for docking.

7. The system of claim 1, further comprising:
a magnet; and
a Hall effect sensor that produces a voltage output that is a function of a relative position of the magnet and the Hall effect sensor;
and wherein sensing the relative position of the electronic device and the docking station comprises interpreting the voltage output from the Hall effect sensor to indicate the relative position of the electronic device and the docking station.

8. The system of claim 7, wherein the electronic device comprises the magnet and the docking station comprises the Hall effect sensor.

9. The system of claim 1, wherein the electronic device comprises a docking connector and the docking station comprises a mating connector, and wherein proper alignment for docking occurs when the docking connector and mating connector are aligned for engagement.

10. The system of claim 9, wherein the docking connector is on a bottom surface of the electronic device.

11. The system of claim 1, further comprising at least one set of electrical contacts used for sensing the relative position.

12. The system of claim 11, wherein the docking station comprises the electrical contacts, and the electronic device comprises conductive means for completing an electrical circuit across the contacts.

13. The system of claim 11, wherein an electrical circuit is completed across a first set of electrical contacts when the electronic device and the docking station are in proper alignment for docking.

14. The electronic device of claim 13, wherein an electrical circuit is completed across a second set of electrical contacts when the electronic device and the docking station depart in a first direction from proper alignment for docking.

15. The system of claim 14, wherein an electrical circuit is completed across a third set of electrical contacts when the electronic device and the docking station depart in a second direction from proper alignment for docking.

16. The system of claim 11, further comprising conductive means for completing an electrical circuit across the contacts, and wherein no more than one set of electrical contacts can have a circuit completed across it at any one time by the conductive means.

17. The system of claim 11, wherein completing the circuit enables the provision of the feedback signal.

18. The system of claim 17, wherein completing the circuit turns on a light emitting diode.

19. The system of claim 1, wherein the electronic device is a laptop portable computer.

20. The system of claim 1, wherein the electronic device is a personal digital assistant.

21. The system of claim 1, wherein the docking station further comprises a backstop that constrains relative motion of the electronic device and docking station in one axis during docking.

22. The system of claim 21, wherein the backstop is substantially smooth.

23. The system of claim 21, wherein the system provides a directional feedback signal indicating in which direction to move one of the system components to achieve proper alignment for docking, the indicated direction of movement being generally orthogonal to the axis of motion constrained by the backstop.

24. A method of docking an electronic device and a docking station comprising;
sensing a relative position between the electronic device and the docking station;
providing an electronically-generated feedback signal that indicates whether the electronic device and the docking station are in proper alignment for docking; and
providing a directional feedback signal that indicates which direction to move one of the system components in order to achieve proper alignment for docking.

25. The method of claim 24, wherein the directional feedback signal is visible.

26. The method of claim 25, wherein providing the directional feedback signal further comprises illuminating an indicator to indicate a direction.

27. The method of claim 24, wherein the directional feedback signal is audible.

28. The method of claim 27, further comprising changing a frequency of the audible directional feedback signal to change the indicated direction.

29. The method of claim 24, wherein sensing the relative position further comprises placing a magnet near a Hall effect sensor such that a voltage output by the Hall effect sensor correlates to a relative position of the magnet and the Hall effect sensor.

30. The method of claim 29, further comprising interpreting the voltage output of the Hall effect sensor as an indication of the relative position of the electronic device and the docking station.

31. The method of claim 24, practiced using a system wherein the electronic device comprises the magnet and the docking station comprises the Hall effect sensor.

32. The method of claim 24, wherein the docking station further comprises a backstop, and further comprising the step of holding the electronic device against the backstop.

33. The method of claim 32, wherein the backstop constrains relative motion of the electronic device and the docking station in one axis during docking.

34. The method of claim 24, wherein sensing the relative position is accomplished using at least one set of electrical contacts.

35. The method of claim 34, wherein sensing the relative position is accomplished by completing a circuit across the set of contacts.

36. The method of claim 34, wherein sensing the relative position is accomplished by breaking a circuit across the set of contacts.

37. The method of claim 34, further comprising determining, using at least two sets of electrical contacts, a direction of relative motion between the electronic device and the docking station, that will achieve proper alignment for docking.

38. The method of claim 24, practiced using a system in which the electronic device is a portable computer.

39. The method of claim 24, practiced using a system in which the electronic device is a personal digital assistant.

* * * * *

UNITED STATES PATENT AND TRADEMARK OFFICE
CERTIFICATE OF CORRECTION

PATENT NO. : 7,103,698 B2  Page 1 of 1
APPLICATION NO. : 10/955600
DATED : September 5, 2006
INVENTOR(S) : Tim L. Zhang et al.

It is certified that error appears in the above-identified patent and that said Letters Patent is hereby corrected as shown below:

In column 8, line 41, in Claim 1, after "system" insert -- , --.

In column 10, line 5, in Claim 24, delete "station comprising;" and insert -- station, comprising: --, therefor.

Signed and Sealed this

Third Day of March, 2009

JOHN DOLL
*Acting Director of the United States Patent and Trademark Office*